United States Patent
Tulsi et al.

(10) Patent No.: US 11,120,504 B2
(45) Date of Patent: Sep. 14, 2021

(54) MULTIPLE ASSET TYPES WITH EMBEDDED RULES

(71) Applicant: eShares, Inc., San Francisco, CA (US)

(72) Inventors: Japjit Singh Tulsi, Los Altos Hills, CA (US); Jerry O. Talton, III, Redwood City, CA (US); Daniel Fike, Elmhurst, IL (US); Neeraj Jain, Pleasanton, CA (US)

(73) Assignee: eShares, Inc., San Francisco, CA (US)

( * ) Notice: Subject to any disclaimer, the term of this patent is extended or adjusted under 35 U.S.C. 154(b) by 0 days.

(21) Appl. No.: 17/102,265

(22) Filed: Nov. 23, 2020

(65) Prior Publication Data

US 2021/0158449 A1 May 27, 2021

Related U.S. Application Data

(60) Provisional application No. 62/940,087, filed on Nov. 25, 2019.

(51) Int. Cl.
*G06Q 40/06* (2012.01)
*G06Q 40/02* (2012.01)
*G06Q 40/04* (2012.01)

(52) U.S. Cl.
CPC ............ *G06Q 40/06* (2013.01); *G06Q 40/02* (2013.01); *G06Q 40/04* (2013.01)

(58) Field of Classification Search
CPC ......... G06Q 40/06; G06Q 40/02; G06Q 40/04
USPC ...................................................... 705/36 R
See application file for complete search history.

(56) References Cited

U.S. PATENT DOCUMENTS

| 2004/0128235 A1* | 7/2004 | Kemper | G06Q 40/02 705/39 |
| 2009/0234850 A1* | 9/2009 | Kocsis | G06F 16/213 |
| 2016/0253759 A1* | 9/2016 | Decanini | G06Q 40/06 705/36 R |

(Continued)

OTHER PUBLICATIONS

Hyperledger Fabric, "Open, Proven, Enterprise-grade DLT," (2020) [online] (retrieved from https://www.hyperledger.org/wp-content/uploads/2020/03/hyperledger_fabric_whitepaper.pdf), 2 pages.

(Continued)

*Primary Examiner* — Jessica Lemieux
(74) *Attorney, Agent, or Firm* — Fish & Richardson P.C.

(57) ABSTRACT

Methods and systems for storing multiple asset types with embedded rules to simplify storage and enable simple and friction-free transactions. One of the methods includes: representing a plurality of asset types using a plurality of standard asset ownership units, each standard asset ownership unit representing a specific asset type; using a roll-up node configured to group specified standard asset ownership units; embedding standard asset unit ownership rules in each standard asset ownership unit, the standard asset ownership unit rules describing permitted behaviors for a specified asset type; embedding roll-up rules in the roll-up node, the roll-up rules including specification of which standard asset ownership units are grouped into the roll-up node, the standard asset ownership unit rules and the role-up rules being based on rules templates; receiving a request for information; and in response to the request, providing information based at least in part on data from the roll-up node.

14 Claims, 8 Drawing Sheets

(56) References Cited

U.S. PATENT DOCUMENTS

2018/0189887 A1     7/2018   Goldstein

OTHER PUBLICATIONS

"What is QLDB—QLDB Guide," (2020) [online] (retrieved from https://www.hyperledger.org/wp-content/uploads/2020/03/hyperledger_fabric_whitepaper.pdf), 5 pages.

International Search Report and Written Opinion in International Application No. PCT/US2020/062062, dated Mar. 2, 2021, 13 pages.

* cited by examiner

MULTIPLE ASSET TYPES WITH EMBEDDED RULES

CROSS-REFERENCE TO RELATED APPLICATIONS

This application claims the benefit under 35 U.S.C. § 119(e) of the filing date of U.S. Patent Application No. 62/940,087, for Multiple Asset Types With Embedded Rules, which was filed on Nov. 25, 2019, and which is incorporated here by reference in its entirety.

BACKGROUND

Technical Field

This specification relates to storing and using multiple asset types with embedded rules.

Background

Current capitalization table ledger systems have friction at the time of creation and during transactions. For example, it is cumbersome to engage corporate lawyers every time a transaction occurs to ensure appropriate rules are followed. The cost and time associated with asset creation or movement is high.

SUMMARY

This specification describes technologies for building a model that stores multiple asset types with embedded rules to simplify and abstract storage and enable simple and friction-free transactions. Such a model can enable a global transaction capability and enable partners to transact using this capability. Such a model simplifies ownership management for companies, investors, and individuals.

In general, one innovative aspect of the subject matter described in this specification can be embodied in methods that include the actions of: representing a plurality of asset types using a plurality of standard asset ownership units, each standard asset ownership unit representing a specific asset type; representing a plurality of standard asset ownership units using a roll-up node configured to group a set of specified standard asset ownership units; embedding standard asset unit ownership rules in each standard asset ownership unit, the standard asset ownership unit rules describing permitted behaviors for a specified asset type; embedding roll-up rules in the roll-up node, the roll-up rules including specification of which standard asset ownership units are grouped into the roll-up node, the standard asset ownership unit rules and the role-up rules being based on rules templates; receiving a request for information; and in response to the request, providing information based at least in part on data from the roll-up node.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Representing a plurality of standard asset ownership units using a roll-up node can include representing a first plurality of standard asset ownership units using a first roll-up node and a second plurality of standard asset ownership units using a second roll-up node and providing information can include providing information based at least in part on data from the first and second roll-up nodes. The method can further include providing an ownership node for a company, the ownership node configured to specify which entities can see and transact those standard asset ownership units that reflect ownership in the company. Thee method can further include providing a tracking node configured to track at least one of a) transactions that do not reflect ownership and b) transactions that do not add value to a roll-up node.

A standard asset ownership unit can have a disclosure set including one of an anonymized, partial and full disclosure set and the method can further include sharing information about the standard asset ownership unit based at least in part on the disclosure set. The specified asset type can be an asset type that represents fractional ownership. The method can further include using a rules engine configured to interpret and enforce the standard asset ownership unit rules embedded in a standard asset ownership unit. The standard asset ownership unit rules can be based at least in part on a rules template and a first rules template can be a parent template and a second rules template can be a child template of the first rules template. In certain implementations, each standard asset ownership unit does not have inherent value separate from the underlying asset that it represents. A first standard asset ownership unit can represent a share, a second standard asset ownership unit can represent an investment vehicle, and a third standard asset ownership unit can represent at least one of cash, debt or an intangible asset.

Another innovative aspect of the subject matter described in this specification can be embodied in methods that include the actions of: representing a plurality of asset types using a plurality of standard asset ownership units, each standard asset ownership unit having a specific asset type, wherein a standard asset ownership unit has no inherent value and derives its value from the asset it represents; embedding standard asset ownership unit rules in each standard asset ownership unit, the standard asset ownership unit rules describing permitted behaviors for a specified asset type, the standard asset ownership unit rules being based on at least one rules template; receiving a request for information; and in response to the request, providing information based at least in part on data from at least one standard asset ownership unit.

The subject matter described in this specification can be implemented in particular embodiments so as to realize one or more of the following advantages. Historically, there has been no singular way to express multiple asset types. Only a small percentage of those who could participate in the capitalization process choose to participate or even understand the process. Democratizing the process, e.g.,, creating a clean and simple way of expressing asset types while following applicable rules, can ensure more people can and will participate. Making it easier for more people to participate in systems for company ownership creates more owners.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies for building a model that stores multiple asset types with embedded rules to simplify and abstract storage and enable simple and friction-free transactions. Such a model enables a global transaction capability, enables partners to transact using this capability, and simplifies ownership management for companies, investors, and individuals.

Current ledger and capitalization table systems have friction at the time of creation of assets and during transactions of those assets. It is cumbersome and expensive to involve corporate lawyers every time a transaction (e.g., an employee stock grant) occurs to ensure appropriate rules are followed. The cost and time associated with asset creation or movement is high relative to what is possible.

Current systems do not provide a singular way to express multiple asset types such as options, stock, and convertible debt. The process of investing, raising capital and/or equity based employee compensation is complicated under current systems. Thus, only a small percentage of individuals who could participate choose to participate or even understand the process. Democratizing the ownership process by creating a simple and accessible way of expressing various asset types while following applicable rules, can encourage more people to participate in ownership.

Figure 1A:
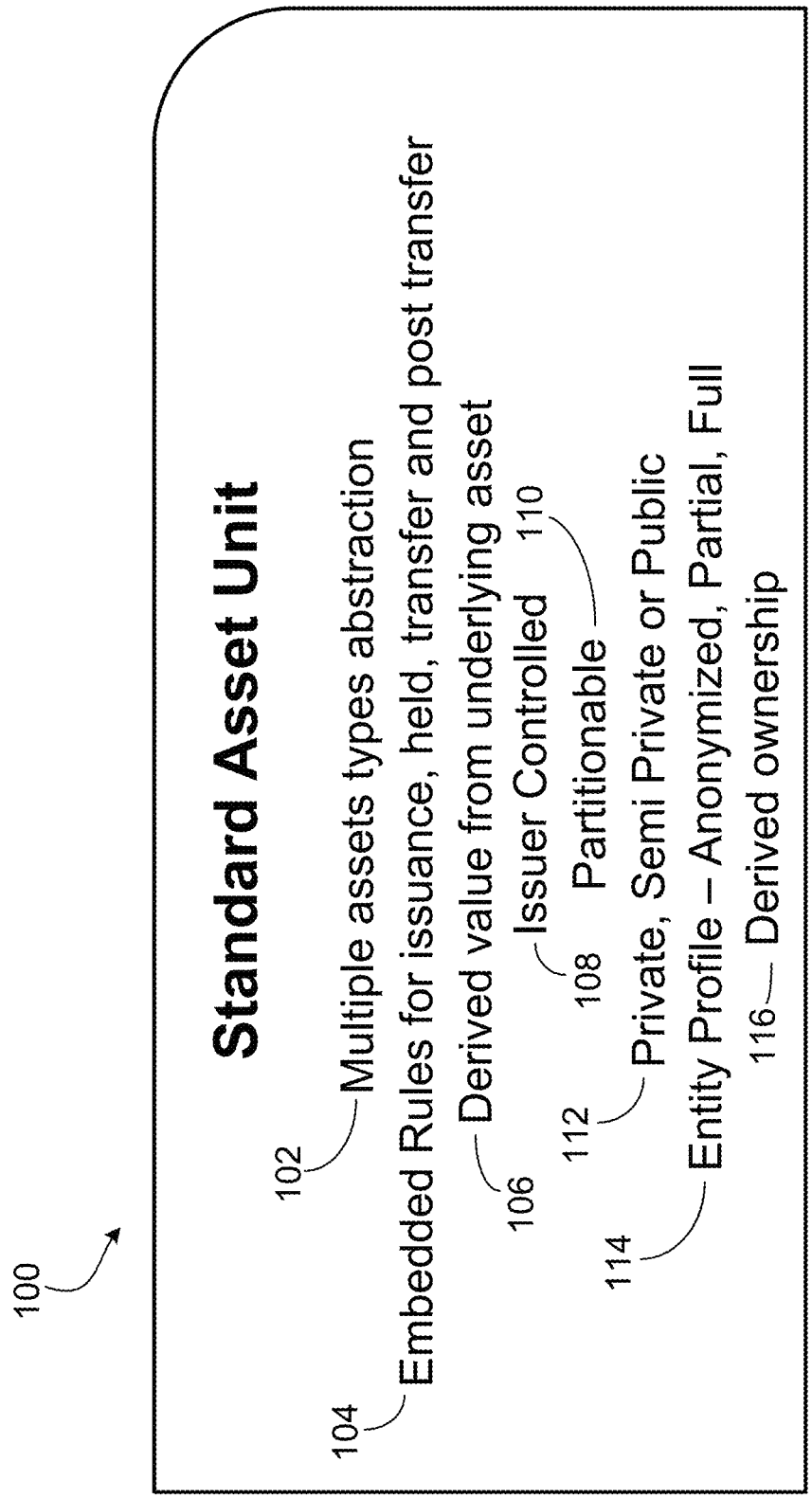
FIG. 1A is a diagram showing one example of a standard asset unit.

This specification describes a standard asset unit used to create a system that encourages greater participation in ownership. FIG. 1A is a diagram showing one example 100 of a standard asset unit. A standard asset unit can represent multiple asset types 102 such as options, stock, convertible debt, special purpose vehicles, limited liability corporations and trusts. An asset type can include any asset type that represents fractional ownership such as ownership in a company, a house or other property (e.g., a valuable painting). A standard asset unit (SAU) can include embedded rules that are based on at least one rules template.

In certain implementations, there can be three different types of (SAUs): Ownership Nodes (also referred to in this specification as ownership units), Rollup Nodes, and Tracking Nodes. Ownership nodes/units have a one-to-one relationship between the owner and the company. The group of ownership nodes pointing to a company make up the company's ledger. Roll-up nodes can have types and tags that can be used to facilitate grouping, e.g., grouping of ownership nodes. Roll-up nodes can have a one-to-many relationship with ownership nodes/units. In certain implementations, roll-up nodes cannot own a security directly. Tracking nodes are nodes used to track arbitrary associations that do not add value to a roll-up node. In other words, a SAU can be non-value or non-additive to allow for tracking units. An example would be one-off capitalization table transactions or intellectual property related assets.

A SAU is an intelligent representation of an underlying asset. Given that a SAU has embedded rules, the embedded rules can act in concert with a master system. In different implementations, different languages, e.g., LUA, JAVASCRIPT, can be used to specify the embedded rules in code. One can use BIGTABLE (a compressed, high performance, proprietary data storage system), QLDB, (a fully managed ledger database), POSTGRES (a free and open-source relational database management system) to store the data and rules code.

A SAU can have an embedded rule that the SAU must undergo an evaluation every year. Such an SAU can schedule a check-in with a master system to ensure that such an annual evaluation occurs. Such a distributed set of rules delegates and distributes the evaluation responsibility making the overall system more intelligent, distributed and efficient relative to a top-down system. An SAU can be comprised of other SAUs, which are themselves comprised of other SAUs, and the transitive closure of that composition can entail more than 100, more than 1000, more than 100,000, or more than a million independent SAUs each with their own, often unique, code-defined rules governing valuation. Computing the value of the "top-level" SAU is something implementations of the present system can do in, on the order of, seconds (e.g., in less than 2 seconds, less than 5 seconds, less than 10 seconds, or less than 30 seconds), or in minutes (e.g., less than 2 minutes or less than 5 minutes) in some extreme cases, but might take a team of people several weeks. It's worth noting that implementations of the SAU system described in this specification are performing functions that people simply do not do today in part because it would be such a difficult to maintain and time-consuming endeavor, and by removing those barriers implementations of the SAU system allow entirely new kinds of assets to exist.

With reference to FIG. 1A, the SAU 100 can embed a variety of rules 104 from a completely templated rule set to a bespoke rule set. In other words, the template rules can be customized per asset type. Some examples of rules include rules that specify:

Who can own the SAU
How much a single party can own
To whom the asset can be sold
How to calculate the value of the SAU
What percentage or block of an asset can be sold at a time
Who determines the price (private vs market value assets).
  For example, the value could be valuation company determined, or market determined How verification is required when the SAU is a public SAU For example, the rules of the illustrated SAU includes rules regarding issuance of the asset(s), rules about who can hold the asset(s) and for how long, and rules regarding when and how one can transfer the asset(s).

The value 106 of the asset unit is derived from the underlying asset(s) that the asset unit represents. The asset unit can be controlled by the issuer 108 that issues the underlying asset. The asset unit can be partitionable 110.

The system can share information about a SAU in a progressive fashion. In terms of who can access an SAU, an SAU can be private, semi-private or public 112. Similarly, an SAU can have an anonymized, partial or full entity profile disclosure 114. An anonymized disclosure set includes the SAU name and value. A partial disclosure set includes the rules that are embedded and the asset types by value. A full disclosure set includes the above as well as an ownership map.

Figure 1B:
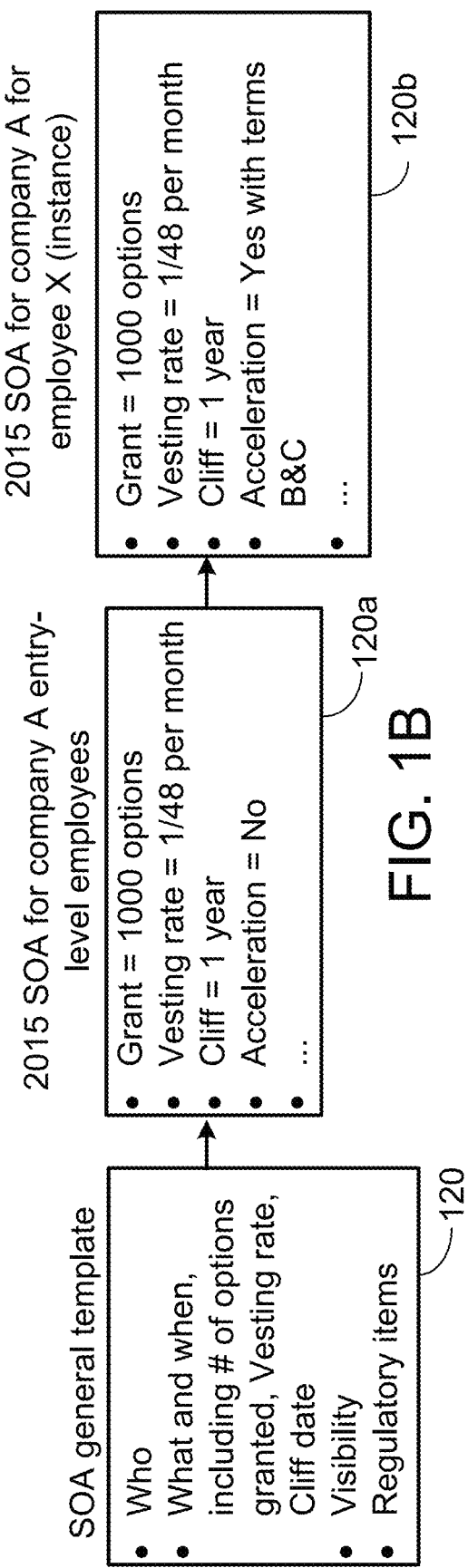
FIG. 1B illustrates examples of standard asset units that represent a general stock option agreement template and versions of stock option agreements.

FIG. 1B illustrates examples of standard asset units that represent various versions of a stock option agreement (SOA). A SOA asset unit template 120 can specify a set of SOA parameters such as the number of options granted, a vesting rate and a cliff date. A specific instance 102a of that template can be the 2015 SOA for company A entry-level employees template and it can include a grant of 1000 options, a vesting rate of ¼s of the total per month, a cliff date of one year (i.e., meaning that the employee will not have any shares vest until the first anniversary of the employee's start date and at the one year anniversary, the employee will have 25% of his/her shares vest), and no acceleration of vesting based on external events. One can further create an exception to the 2015 company A entry-level employee SOA template, e.g., a 2015 company A SOA for employee X 120b. The exception can include the rules and parameters of the 2015 company A entry-level employee SOA template but it can include one or more changes, e.g., it can allow acceleration with various relevant terms such as how many shares will vest immediately upon at least one specified trigger. Thus, a user can create a new standard asset unit using one of a variety of templates, e.g., a generic template, a company level template or an individual level template.

Figure 1C:
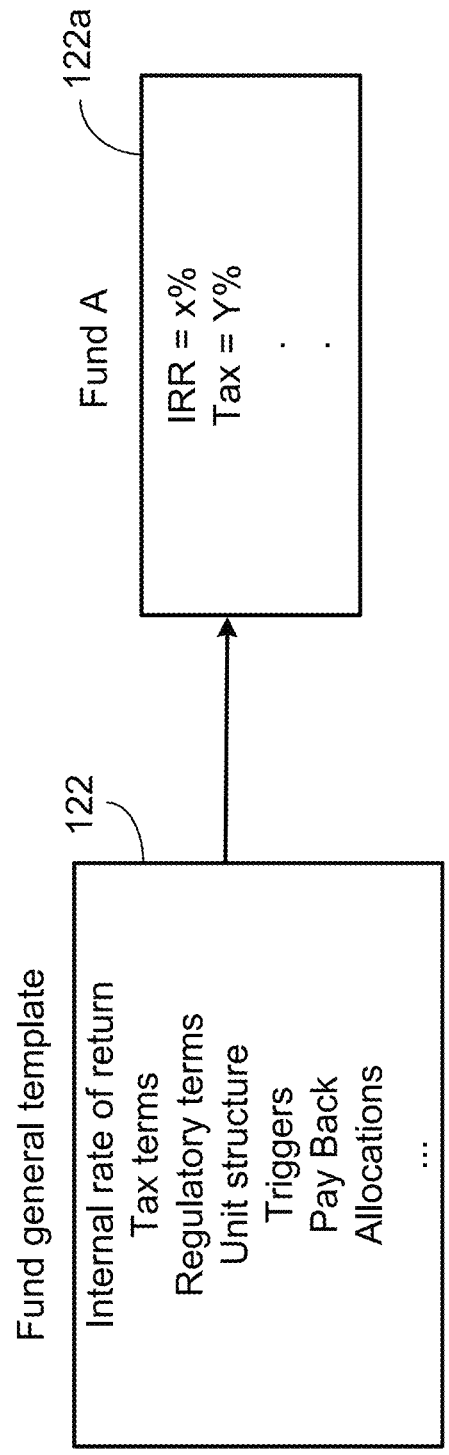
FIG. 1C illustrates examples of standard asset units that represent a general fund template and a version of a fund arrangement.

FIG. 1C illustrates examples of standard asset units that represent versions of a funding arrangements. A generic fund template 122 can specify a variety of fund terms such as an internal rate of return (IRR), tax terms, applicable regulatory terms, unit structure, triggers, pay back terms and allocations. A specific fund template, e.g., Fund A template 211a, can include specific parameters for the relevant fund terms, e.g., and IRR of X % and a tax of Y %.

Figure 1D:
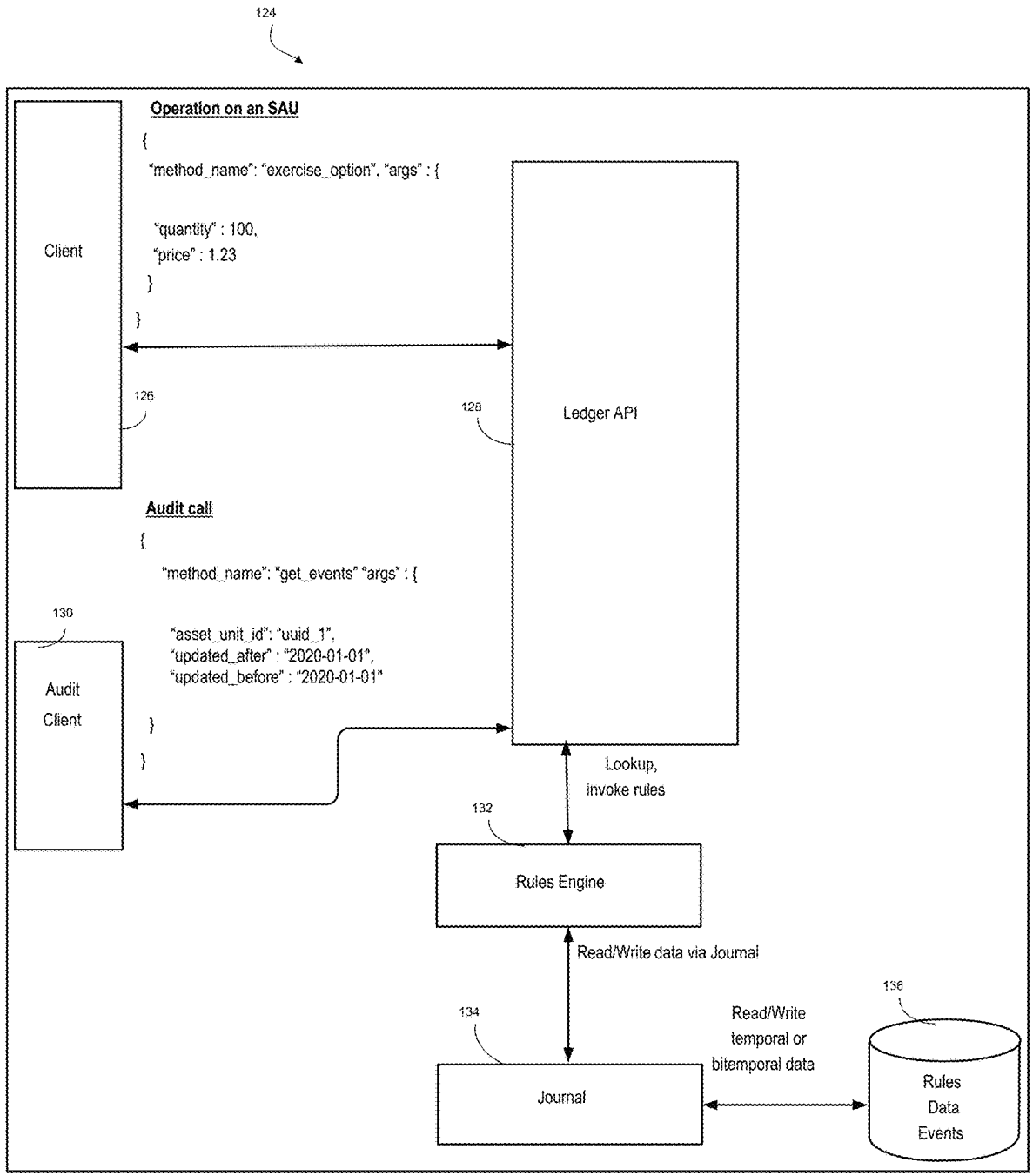
FIG. 1D is a system diagram of one exemplary system for working with standard asset units.

FIG. 1D is a system diagram of one exemplary system for working with standard asset units. FIG. 1D shows a client 126 submitting an operation to a ledger API 128. The operation in this case is the exercise of 100 options at $1.23. The Ledger API 128 can perform a lookup and invoke rules via the rules engine 132. The rules engine in turn can read and/or write data via a journal 134 which in turn can read and/or write temporal or bi-temporal data to a database 136 that stores rules, data, and events. One implementation of a universal ledger including a journal is described in U.S. patent application Ser. No. 17/102,058, filed on Nov. 23, 2020, entitled "Extensible Universal Ledger" and incorporated herein by reference in its entirety.

The system can also periodically make audit calls to an audit client 130. In the illustrated example the audit call involves a query for events related to a specified asset between specified dates.

The rules engine can be authored, e.g., in JAVA, KOTLIN. In one implementation, the rules engine can operate as follows: 1) a client can make an API request; 2) an API implementation can invoke the Ledger library; 3) the Ledger library can look up the rules using the journal API; 4) the rules themselves can read/write data using the Ledger Library; 5) data can be read from/written to using the journal API; and 6) the Journal interacts with the physical data layer and records data with respective timestamps. Rules themselves can be authored e.g., in LUA, JAVASCRIPT.

Figure 2:
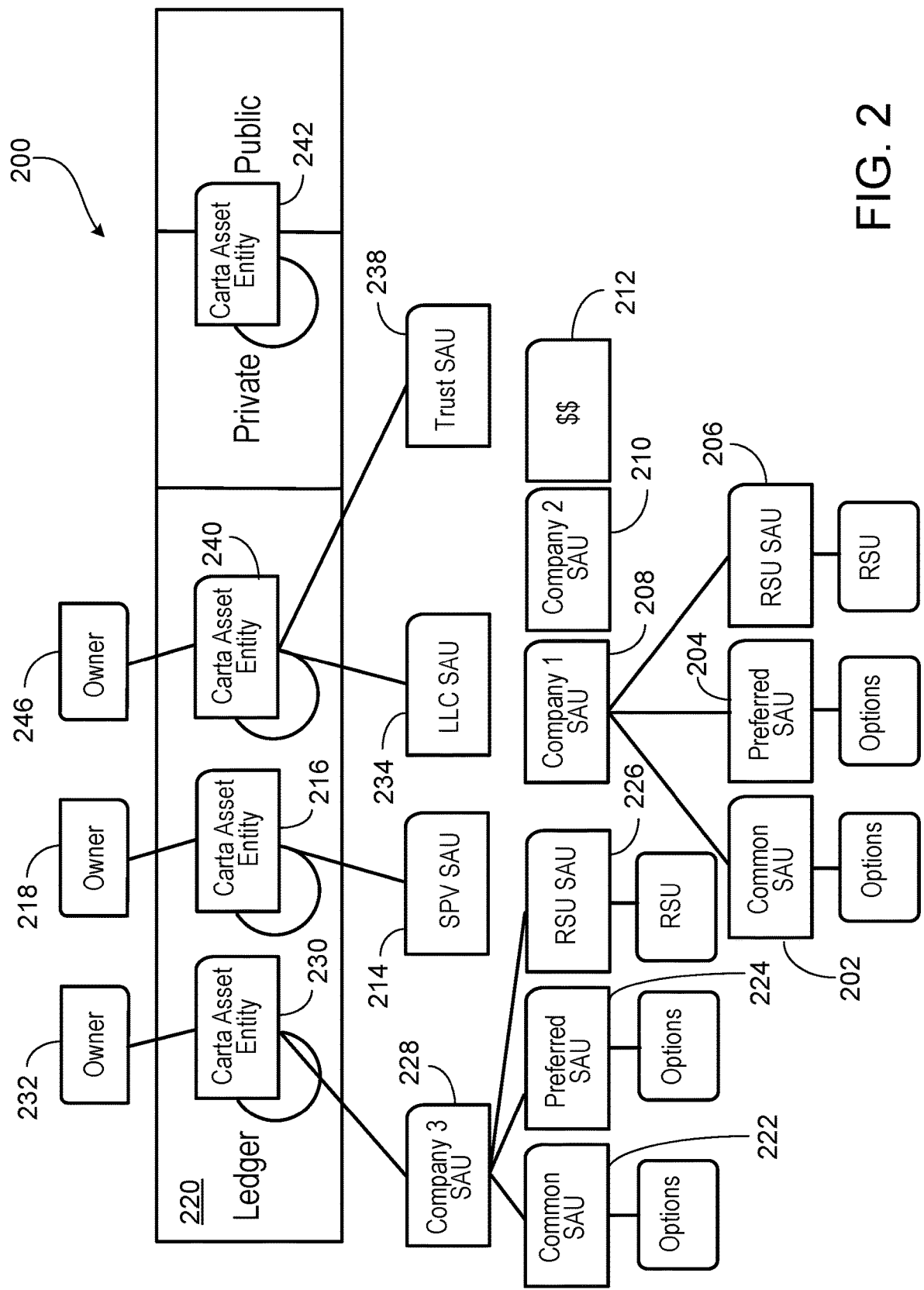
FIG. 2 is a diagram showing an example of a standard asset unit model.

FIG. 2 is a diagram showing one example 200 of a standard asset unit (SAU) model. In the illustrated example, a set of SAUs can roll-up into an asset entity, e.g., an asset entity that has an owner, and the asset entity can be reflected on a ledger. For example common options in company 1 can be represented by a common SAU 202, preferred options can be represented by a preferred SAU 204 and restricted stock units (RSUs) can be represented by a RSU SAU 206. SAUs 202, 204, and 206 roll up to a company 1 SAU 208 and the company 1 SAU 208, a company 2 SAU 210 and funds 212 can in turn roll up to a special purpose vehicle (SPV) SAU 214. The SPV SAU 214 can in turn roll-up to an asset entity 216 that has an owner 218.

Similarly, a company 3 SAU 228 can be a roll-up node for a common SAU 222, a preferred SAU 224 and a RSU SAU 226. The company 3 SAU can in turn roll-up to an asset entity 230 that has an owner 232. SAUs can represent other types of assets. For example an asset entity 240 having an owner 246 can be a roll-up node for a LLC SAU 234 and a trust SAU 238.

The SAU model as illustrated in FIG. 2 allows SAUs that represent different underlying asset types to be represented equally. The model allows transactions to be private, semi-private or public. The model allows an issuer to control issued SAUs. The model also allows for value assessment across disparate underlying assets.

Ownership of the assets can be at SAU root or leaf level. An example of the root level would be an LLC or SPV where each leaf node is split evenly. An example of the leaf level ownership would be ownership of a company at the common or preferred SAU leaf where the overall company ownership is a rollup of the leaf nodes totaling to 100% in value. Mixed ownership at different levels is also possible in cases involving mixed asset classes.

In one implementation, each owner has a SAU for each asset type owned. The owner can be an individual or a shared ownership through an LLC or Trust. If there are many owners, one can split the ownership up into multiple SAUs as opposed to representing the ownership via an aggregated approach such as an LLC or Trust. If the underlying asset splits, e.g., if there is a stock-split or dividends, the system can either update the value of the SAU or an SAU can be split into two or more SAUs.

Transaction of a SAU can have multiple stakeholders including the buyer, seller, and/or the SAU controller. The controller can be the seller or the issuing party based on the rules defined. A transaction can follow the progressive information sharing guidelines expressed above. The transaction itself is designed to be a simple transfer of ownership as long as the transaction passes the applicable rules defined in the underlying SAU. Given some transactions might have legal and financial rules that apply, the SAU involved can have such rules embedded as requirements. One implementation of a SAU-based system allows private transactions where the parties are named and invited to the transaction either via the seller or the SAU controller if different from the seller. If rules would change as a result of a transaction then the transaction system can record a new SAU via a ledger, e.g., the ledger shown in FIG. 3. Similarly, in the case of a partial sale, a new SAU can be issued for the portion sold. If a mistake is made, an administrator can correct the mistake and all the transactions are recorded for audit purposes.

In certain implementations, a SAU is tradable through partners (e.g., exchanges) via API's. Public trading is possible through broker-dealer and exchange API's. "Know your client" requirements and anti-money-laundering requirements via partners can be a prerequisite to trade. The API can enable such prerequisite(s).

As an example, assume S sets up a fund that consists of three Company Holdings and three equal owners S, P and V. The fund has a value of $90M. The system can issue 3 SAUs of 30M in value with a corresponding ruleset. V wants to sell half his share to Y. The system can partition V's SAU into two SAUs V1 and V2 (in this case, i.e., in the case of splits with no transaction, the child SAUs would inherit rules of the parent SAU). V then transfers ownership of V2 to Y with the rule set over which S has control.

Figure 3:
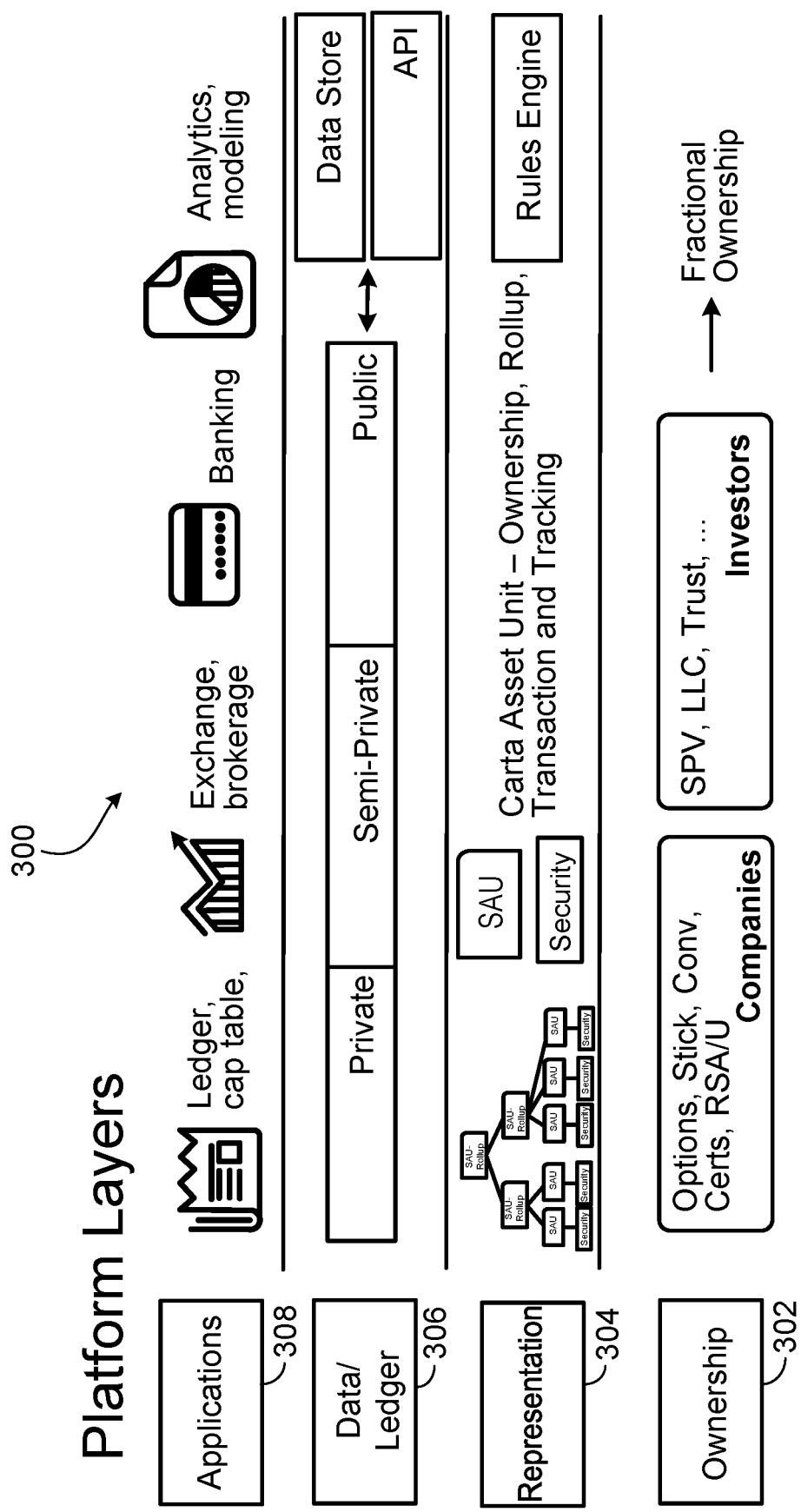
FIG. 3 illustrates an example of platform layers for which the standard asset unit model of FIG. 2 is a part.

FIG. 3 illustrates one example of platform layers 300 that include a representation layer 304 based on a standard asset unit (SAU) such as the SAU illustrated in FIG. 1A and that can result in a variety of useful applications. The platform layers include an ownership layer 302, the representation layer 304 note above, a data/ledger layer 306 and an application layer 308 at the top of the stack. The ownership layer 302 can include any form of fractional ownership such as ownership, e.g., ownership of a company, by investors and employees, e.g., via options or stock and ownership by investors via other means, e.g., by a special purpose vehicle or trust. It can also include company debt.

The representation layer 304 can include a SAU that, as noted above, stores multiple asset types with embedded rules to simplify and abstract storage and enable simple and friction-free transactions. Such a model enables a global transaction capability, enables partners to transact with reduced friction, and simplifies ownership management for companies, investors, and individuals. The illustrated representation layer also includes a rules engine 304a for executing rules embedded in SAUs (as described further below).

The data/ledger layer 306 can include at least one private ledger, at least one semi-private ledger or at least one public ledger or a combination of these. The data/ledger layer can also include an API to allow external systems to interact with the ledger and data sources to supply data to the ledger.

The application layer 308 can include a variety of applications that access the data/ledger layer 306. The applications can be, for example, a capitalization table application, an exchange application, a banking application, and/or an analytics application.

Having described a SAU, an SAU model, and how a representation such as an SAU model can fit into a set of platform layers, this specification turns to a deeper discussion of a roll-up node. As noted above, a roll-up node has a one-to-many relationship with ownership nodes/units. Roll-up nodes can have types and tags that can be used to facilitate further grouping A roll-up template can define the rules by which a roll-up node operates. A roll up standard asset unit defines how standard asset ownership units roll up. For example, in the case of a roll-up node for stock option agreement standard asset ownership units, the roll-up node may need to do a specific type of expense reporting. A roll up can cost a company differently in the case of acceleration so the roll-up node may have to add 30% for expense reporting because one of the SOA ownership units has an acceleration clause.

Figure 4:
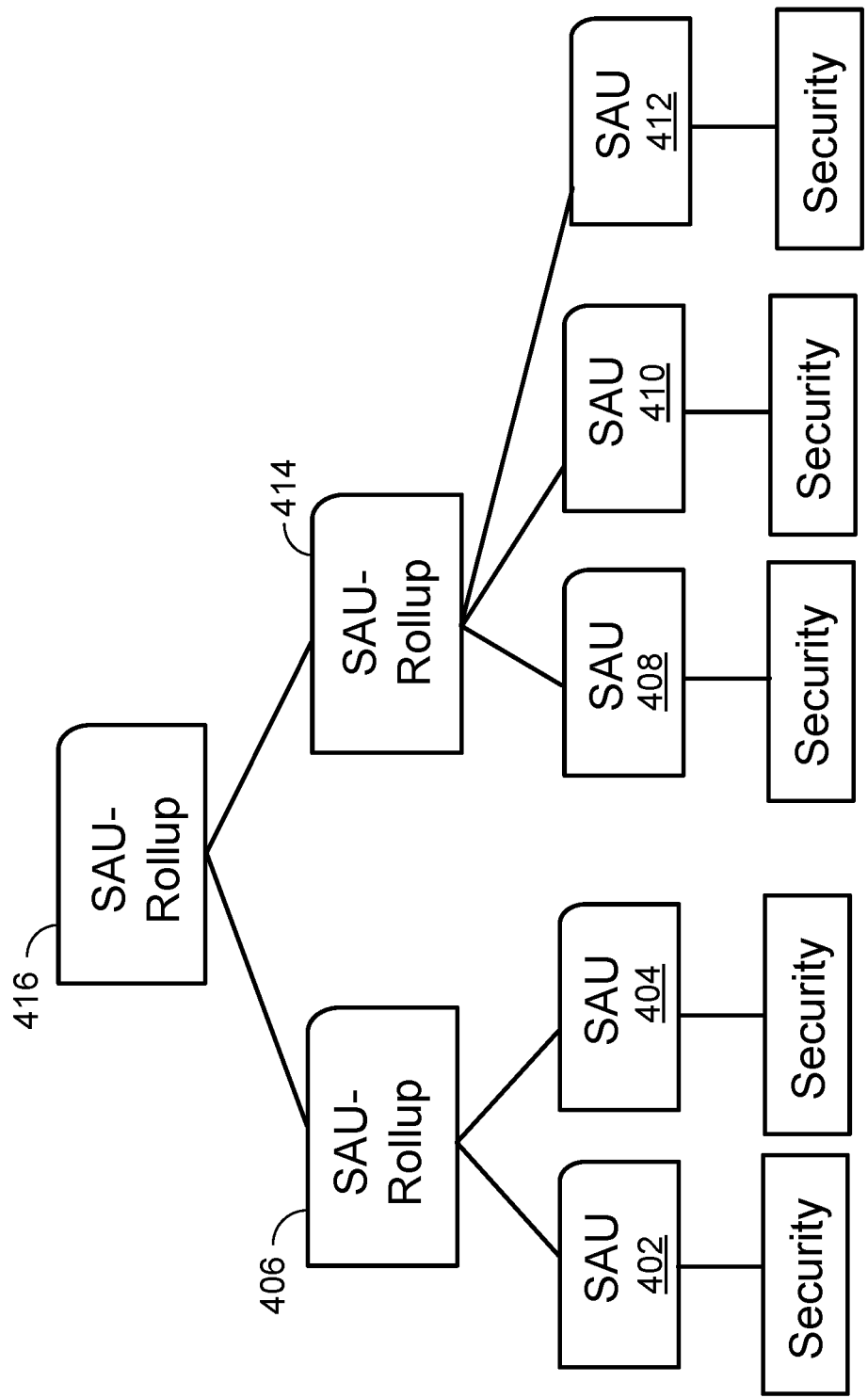
FIG. 4 is a diagram of one example of a roll-up node that is part of the standard asset unit model of FIG. 2.

FIG. 4 is a diagram of one example of a roll-up node that is part of a standard asset unit model. Ownership SAUs 402 and 404 roll-up to roll-up SAU 406. Similarly, ownership SAUs 408, 410 and 412 roll-up to roll-up node 414. As illustrated in FIG. 4, roll-up SAUs 406 and 414 in turn roll-up to roll-up SAU 416. Each of the ownership SAUs has a 1:1 relationship with underlying securities. As an example ownership SAUs 402 and 404 can each represent option grants to 20% of the equity in a company. Similarly, ownership SAUs 408, 410 and 412 can each represent 20% of the equity of the company but in the form of RSUs. Roll-up SAU 406 can represent all the option grants for the company and roll-up SAU 414 can represent all the RSU grants for the company. Finally, roll-up SAU 416 can represent the total ownership for the company.

Roll-up nodes facilitate modelling ownership. Using roll-up nodes, investments (e.g., series A investments, series B investments) can be broken out showing the underlying ownership SAUs. As another example, roll-up nodes can help to analyze SAUs that have acceleration. Acceleration can count as an addition cost, e.g., a 30% additional cost, to the company. The roll-up rules are initially defined by a roll up node template and the rules define how the roll-up node aggregates the SAUs that roll-up into the roll-up node. The roll-up rules can include other rules, For example, in the context of a fund family, the roll-up rules can further include which funds are blockers and which are pass-throughs for tax purposes.

The following provides an example of a Fund Roll-up node and Fund Account ownership nodes. 'Fund' represents an investment fund with cash commitments or participation from a collection of partners. Meanwhile, 'FundAccount' represents an account for tracking a balance of either cash, credit, debit, or equity held by an investment fund.

'FundAccount' represents a regular (ownership) SAU and 'Fund' a roll-up SAU. Stated differently, the 'FundAccount' SAU represents ownership and/or value; The 'Fund' SAU however rolls up the details of multiple 'FundAccount' objects and derives ownership/value from those FundAccount object. The following depicts Fund Account and Fund SAUs, e.g., using pseudo code

```
SAU FundAccount-A:
    balance = 1000
    assetInfo = 'USD'
    partner = "Partner 23"
    name = "Distribution Cash for Partner 23"
    RULE transact(self, amount):
        self, balance += amount
SAU FundAccount-B:
    balance = 500
    assetInfo = {
        company = "Company 88"
        type = "Series A Preferred Stock"
    }
    partner = null
    name = "Equity received in Company 88 Series A"
    RULE transact(self, amount):
        self.balance += amount
        assert self.balance > 0
SAU Fund-XYZ:
    accounts = [
        "FundAccount-A",
```

-continued

```
        "FundAccount-B",
        ...
    ]
    partners = [
        "Partner 23",
        ...
    ]
    RULE createAccount(self, accountParameters):
        new FundAccount(accountParameters)
    RULE createPartner(self, partnerParameters):
        assert partner.commitment > 0
        self.partners.append(partnerParameters)
        # Create corresponding accounts
        self.createAccount(...)
    RULE transact(self, params):
        for acct in params.accounts:
            acct.transact(...)
    RULE submitDisbursement(self, params):
        assert params.amount > 0
        # TODO: Additional validation before disbursement
        for partner in self.partners
            self.transact(...)
```

More generally, each SAU contains a data payload to describe it, and a set of "rules" logic by which the data can be manipulated. The Rules Engine receives a user's intent to mutate data according to a defined rule and in turn follows that rule (executes the validation and fulfillment instructions) to effect that change.

A novel thing about SAUs is that one can change a rule if one needs to do so. Note how 'FundAccount-B' has additional validation within its 'transact' method.

A ledger can include one implementation of a Rules Engine. A Rules Engine is not necessarily responsible for how those rules change. Rather a rules engine interprets/enforces/invokes the rules in an SAU.

A SAU instance (e.g., FundAccount-B above) goes into the rules engine, along with a user intent to execute a rule (e.g., 'transact'). The "Rules Engine" makes the work happen (e.g., in the example above, the rules engine can write a new 'balance' into the relevant account).

When a SAU is recorded, full SAU pseudocode blocks, such as those shown above, are recorded in a ledger.

In certain implementations, a ledger supports storing SAUs as two separate objects—one with the data and the other with the rules, and one can refer to the set of rules as a "Template" so it can be more easily shared/updated across multiple objects at once.

When this specification refers to "Standard Rules", it does not necessarily mean that for every SAU that a set of standard rules exist, but rather that a set of standard rules exists just for a particular set of SAUs. For example, the 'Fund' above has a series of 'FundAccount' objects, and they must all define a 'transact' rule.

One can imagine how employee incentive plans may include SAU's with a 'vest' rule, and higher level constructs need not care whether they are vesting RSUs, options, or 401k matches.

For a particular ledger purpose, one might expect the vast majority of SAUs to be required to define rules such as a "getFairMarketValue" rule, with application involving RSUs, options, shares, investment funds, cash accounts, etc, all implementing the rule(s) very differently.

Figure 5A:
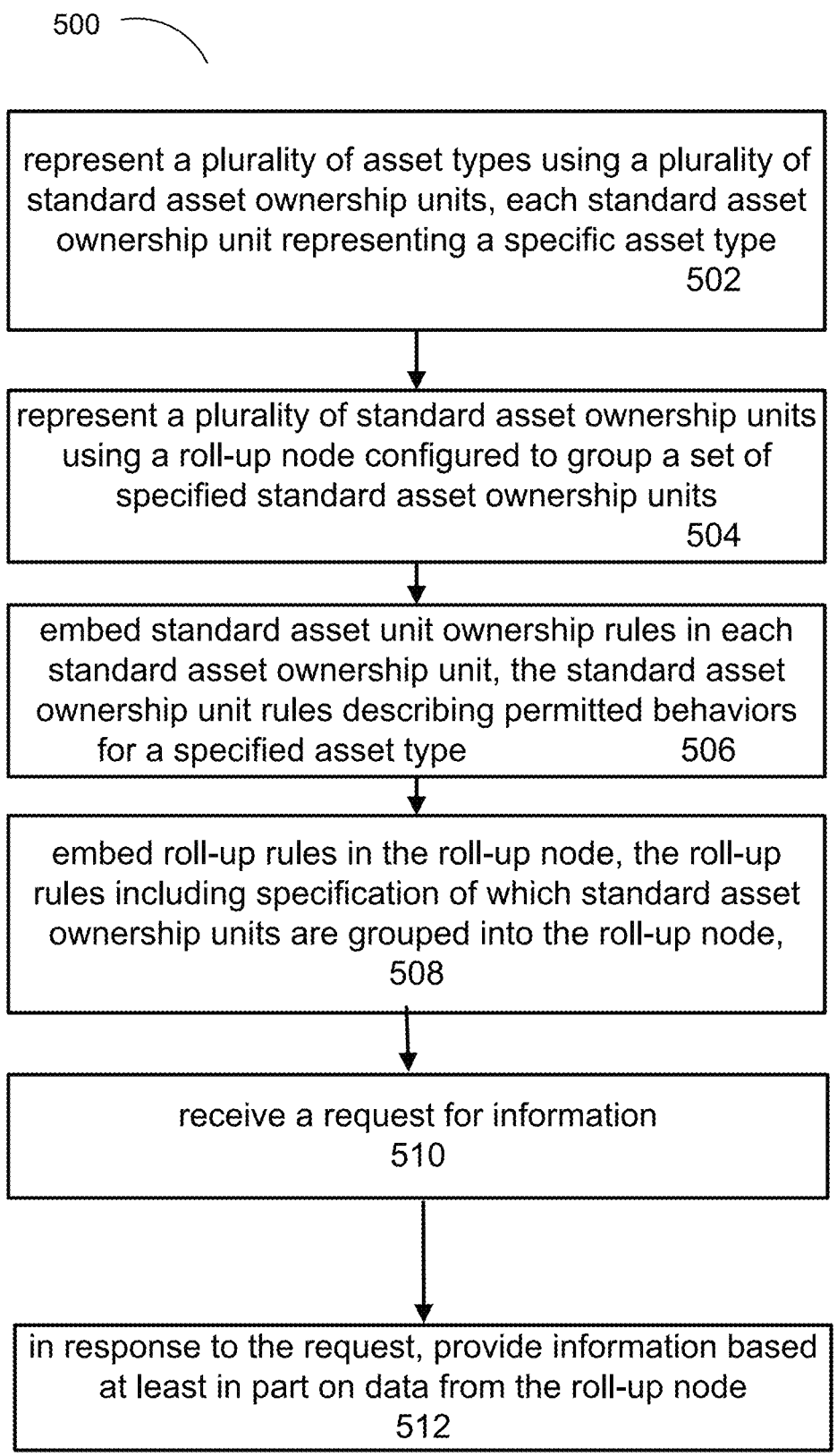
FIG. 5A is a flow chart of one example of a process utilizing a standard asset unit model.

FIG. 5A is a flowchart of an example process 500 for representing multiple asset types using a standard asset unit. For convenience, the process 500 will be described as being performed by a system of one or more computers, located in one or more locations, and programmed appropriately in accordance with this specification. The process can include: representing 502 a plurality of asset types using a plurality of standard asset ownership units, each standard asset ownership unit representing a specific asset type; representing 504 a plurality of standard asset ownership units using a roll-up node configured to group a set of specified standard asset ownership units; embedding 506 standard asset unit ownership rules in each standard asset ownership unit, the standard asset ownership unit rules describing permitted behaviors for a specified asset type; embedding 508 roll-up rules in the roll-up node, the roll-up rules including specification of which standard asset ownership units are grouped into the roll-up node, the standard asset ownership unit rules and the role-up rules being based on rules templates; receiving 510 a request for information; and in response to the request, providing 512 information based at least in part on data from the roll-up node.

Figure 5B:
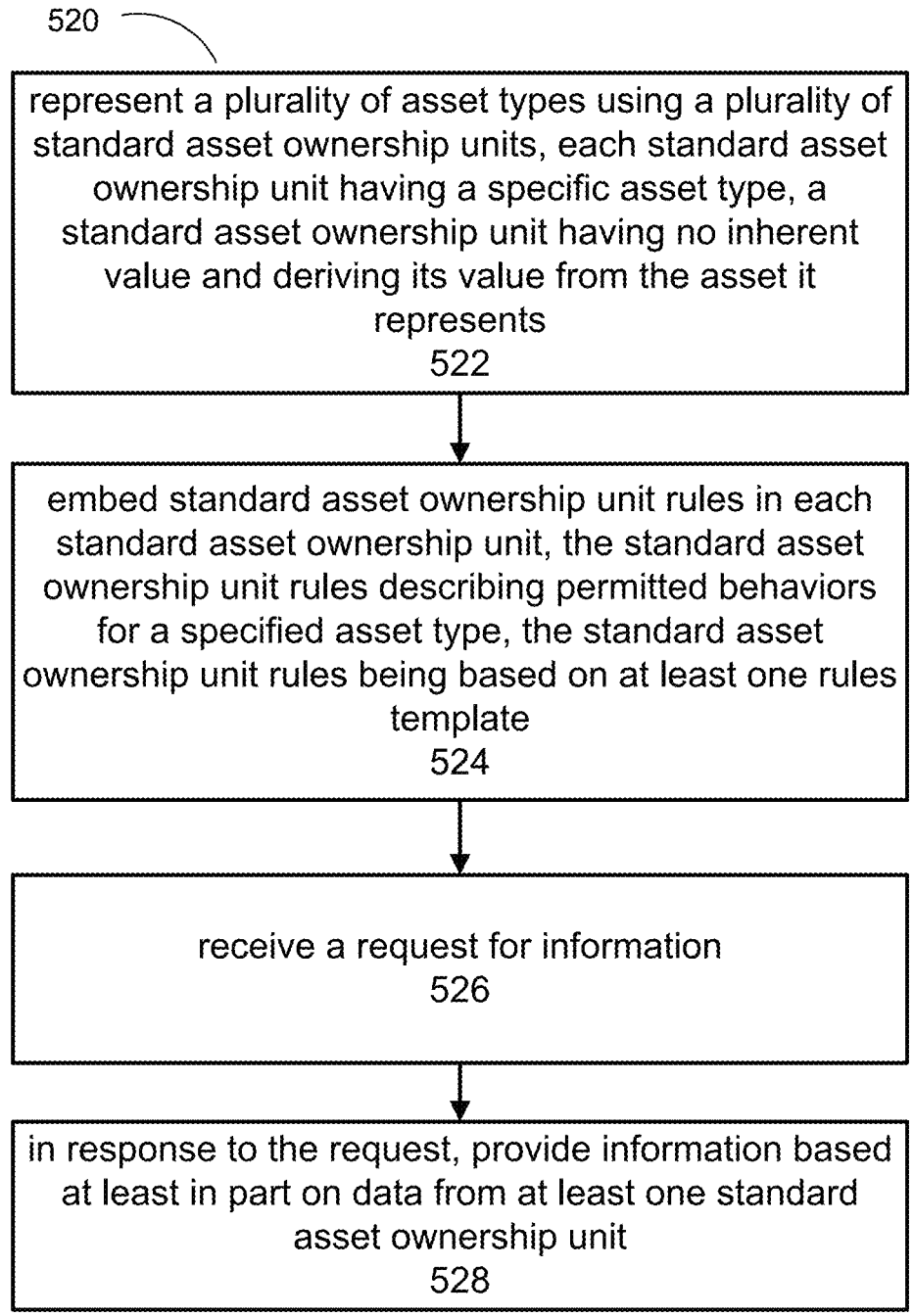
FIG. 5B is a flow chart of another example of a process utilizing a standard asset unit model.

FIG. 5B is a flowchart of an example process 520 for representing multiple asset types using a standard asset unit. For convenience, the process 520 will be described as being performed by a system of one or more computers, located in one or more locations, and programmed appropriately in accordance with this specification. The process can include: representing 522 a plurality of asset types using a plurality of standard asset ownership units, each standard asset ownership unit having a specific asset type, wherein a standard asset ownership unit has no inherent value and derives its value from the asset it represents;

embedding 524 standard asset ownership unit rules in each standard asset ownership unit, the standard asset ownership unit rules describing permitted behaviors for a specified asset type, the standard asset ownership unit rules being based on at least one rules template; receiving 526 a request for information; and in response to the request, providing 528 information based at least in part on data from at least one standard asset ownership unit.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   representing a plurality of asset types using a plurality of standard asset ownership units, each standard asset ownership unit representing a specific asset type;
   representing a plurality of standard asset ownership units using a roll-up node grouping a set of specified standard asset ownership units;
   providing at least one tracking node tracking a) transactions that do not reflect ownership of a company by an entity and b) transactions that do not add value to the roll-up node, wherein the standard asset ownership units, the at least one tracking node and the roll-up nodes comprise more than a hundred standard asset units;
   embedding standard asset unit ownership rules in each standard asset ownership unit, the standard asset ownership unit rules describing permitted behaviors for a specified asset type;
   embedding roll-up rules in the roll-up node, the roll-up rules including specification of which standard asset ownership units are grouped into the roll-up node, the standard asset ownership unit rules and the role-up rules being based on rules templates;
   using a rules engine to interpret and enforce standard asset unit rules embedded in each standard asset unit;
   receiving a request for information; and
   in response to the request, taking action comprising modelling ownership including providing information based at least in part on data and a roll-up rule from the roll-up node.

2. The method of claim 1, wherein representing a plurality of standard asset ownership units using a roll-up node comprises representing a first plurality of standard asset ownership units using a first roll-up node and a second plurality of standard asset ownership units using a second roll-up node and wherein providing information comprises providing information based at least in part on data from the first and second roll-up nodes.

3. The method of claim 1, wherein the method further comprises providing an ownership node for a company, the ownership node specifying which entities can see and transact those standard asset ownership units that reflect ownership in the company.

4. The method of claim 1, wherein a standard asset ownership unit has a disclosure set including one of an anonymized, partial and full disclosure set and wherein the method comprises sharing information about the standard asset ownership unit based at least in part on the disclosure set.

5. The method of claim 1, wherein the specified asset type is an asset type that represents fractional ownership.

6. The method of claim 1, wherein the standard asset ownership unit rules are based at least in part on a rules template and wherein a first rules template is a parent template and a second rules template is a child template of the first rules template.

7. The method of claim 1, wherein each standard asset ownership unit does not have inherent value separate from an underlying asset that it represents.

8. The method of claim 1, wherein a first standard asset ownership unit represents a share, a second standard asset ownership unit represents an investor vehicle, and a third standard asset ownership unit represents at least one of cash, debt or an intangible asset.

9. A system comprising:
   one or more computers and one or more storage devices on which are stored instructions that are operable, when executed by the one or more computers, to cause the one or more computers to perform operations comprising:
   representing a plurality of asset types using a plurality of standard asset ownership units, each standard asset ownership unit representing a specific asset type;
   representing a plurality of standard asset ownership units using a roll-up node configured to group a set of specified standard asset ownership units;
   providing at least one tracking node tracking a) transactions that do not reflect ownership of a company by an entity and b) transactions that do not add value to the roll-up node, wherein the standard asset ownership units, the at least one tracking node and the roll-up nodes comprise more than a hundred standard asset units;
   embedding standard asset unit rules in each standard asset ownership unit, the standard asset ownership unit rules describing permitted behaviors for a specified asset type;
   embedding roll-up rules in the roll-up node, the roll-up rules specifying which standard asset ownership units are grouped into the roll-up node, the standard asset ownership unit rules and the role-up rules being based on rules templates;
   using a rules engine to interpret and enforce standard asset unit rules embedded in each standard asset unit;
   receiving a request for information; and
   in response to the request, taking action comprising modelling ownership including providing information based at least in part on data and a roll-up rule from the roll-up node.

10. The system of claim 9, wherein representing a plurality of standard asset ownership units using a roll-up node comprises representing a first plurality of standard asset ownership units using a first roll-up node and a second plurality of standard asset ownership units using a second roll-up node and wherein providing information comprises providing information based at least in part on data from the first and second roll-up nodes.

11. The system of claim 9, wherein a standard asset ownership unit has a disclosure set including one of an anonymized, partial and full disclosure set and wherein the operations further comprise sharing information about the standard asset ownership unit based at least in part on the disclosure set.

12. The system of claim 9, wherein the specified asset type is an asset type that represents fractional ownership of a company.

13. The system of claim 9, wherein each standard asset ownership unit does not have inherent value separate from the underlying asset that it represents.

14. The system of claim 9, wherein a first standard asset ownership unit represents a share, a second standard asset ownership unit represents an investor vehicle, and a third standard asset ownership unit represents at least one of cash, debt or an intangible asset.

\* \* \* \* \*